United States Patent [19]

Ogawa

[11] Patent Number: 5,597,269
[45] Date of Patent: Jan. 28, 1997

[54] CUTTING TOOL FOR HONEYCOMB CORE

[75] Inventor: Ryuichi Ogawa, Tochigi, Japan

[73] Assignee: Fuji Jukogyo Kabushiki Kaisha, Tokyo, Japan

[21] Appl. No.: 257,728

[22] Filed: Jun. 9, 1994

[30] Foreign Application Priority Data

Jun. 30, 1993 [JP] Japan ................................. 5-162434

[51] Int. Cl.⁶ .............................. B23C 5/10; B23C 3/00
[52] U.S. Cl. ............................ 407/54; 407/62; 408/230
[58] Field of Search ................................. 407/34, 42, 53, 407/54, 61–64; 408/215, 216, 221, 222, 223, 230; 144/221

[56] References Cited

U.S. PATENT DOCUMENTS

| | | | |
|---|---|---|---|
| 4,274,771 | 6/1981 | Nishimura | 408/230 |
| 4,645,389 | 2/1987 | Maier | 408/230 |

*Primary Examiner*—M. Rachuba
*Assistant Examiner*—Kenneth J. Hansen
*Attorney, Agent, or Firm*—Beveridge, DeGrandi, Weilacher & Young, L.L.P.

[57] ABSTRACT

A cutting tool for cutting a honeycomb core having a plurality of spiral blades each of which is formed integratedly with a cylindrical body of the cutting tool and has a lead angle of 60 degrees and more with respect to an axis of the cylindrical body. Each of blades comprises a radial edge with a lip angle ranging from 1 degree to 20 degrees along the periphery of the cutting tool and a bottom edge with a lip angle ranging from 1 degree to 20 degrees at the bottom of the cutting tool. The bottom edge curved outward in the revolutional direction of the blade.

9 Claims, 3 Drawing Sheets

CUTTING TOOL FOR HONEYCOMB CORE

BACKGROUND OF THE INVENTION

The present invention relates to a cutting tool to be used for a cutting work of honeycomb cores.

As a commonly used cutting tool for cutting honeycomb cores, there is a valve stem shaped cutter (hereinafter referred to as "valve stem cutter") having a sharp cutting edge like razor blade built along the periphery of a conical disk.

Since this valve stem cutter has no kerf on the cutting edge, it keeps in a linear contact with a workpiece during a cutting work, consequently this type of cutter tends to be burned at the cutting edge due to frictional heat. Further, differently from usual cutting tools, since the valve stem cutter cuts a workpiece like slitting or splitting by continuously applying an edge laterally, it needs a high rotational speed in nature. However, on the other hand, the feed speed can not be raised so much for the high rotational speed of the cutting tool, as a result in some case it becomes difficult for this type of cutting tool to cut the plate constituting the honeycomb core, if the thickness of the plate is large.

As an improved valve stem cutter, there is proposed a cutting tool for cutting a honeycomb core in which several splitting saws with a different diameter are coaxially heaped up so as to break tips produced from the splitting saws with a large diameter by the splitting saws with a small diameter (Japanese utility application laid open No. 1989-315).

However, the cutting edge of this splitting type cutter is not so keen as a razor edge, therefore there are such problems that a large cutting resistance is applied on it, burs tend to be produced on its cutting plane and a workpiece tends to be deposited on its cutting edge at high speed cuttings because it has a small chip pocket and a straight edge On the other hand, as another type of cutting tool for honeycomb core which is different from the above splitting type cutter, there is an intermittent cutting type of cutter. For example, as disclosed in Japanese utility application published No. 1991-75922, there is a cutting tool having a disk-shaped cutter with a chip space and a radial relief angle at the cutting edge. The chip space of the disk-shaped cutter is integratedly connected to the chip space of the chip breaker. Furthermore, in order to raise a bite-in characteristic and at the same time to reduce a cutting resistance, an axial rake angle is built in the disk-shaped cutter along the chip space twisted towards the right hand and additionally a positive radial rake angle is built both in the cutter and the chip breaker.

This intermittent cutting type cutter has also disadvantages that surface finishing becomes poor and further a cutting work of high precision can not be performed efficiently because a work-holding of the honeycomb core on the machine tends to become unstable due to a vibrational force acting on the workpiece.

SUMMARY OF THE INVENTION

In view of the foregoing problems and disadvantages, an object of the present invention is to provide a cutting tool which can make an efficient cutting process on a honeycomb core by reducing a cutting resistance and preventing a cutting edge from being burned.

To attain the above object, the cutting tool according to the present invention is provided with: a plurality of spiral blades built integratedly with a cylindrical body of the cutting tool at the periphery thereof, each of blades with a lead angle more than 60 degrees with respect to the axis of the cylindrical body; a radial edge with a lead angle ranging from 1 to 20 degrees; and a bottom edge curved outward in the direction of the blade with a lead angle ranging from 1 to 20 degrees.

According to the present invention, the cutting tool has a plurality of spiral blades and each of the blades has a keen cutting edge with an extremely acute angle which comprises a radial edge portion and a bottom edge portion. A depth of cut is restricted by the vertical length of the radial edge portion and a width of cut is determined approximately by the bottom edge portion which corresponds to the diameter of the cutting tool. Observing one blade in the cutting tool, the cutting edge of the blade cuts an object by splitting and at the same time scraping, however viewing the whole of the cutting tool, it cuts the object intermittently. Namely, according to the cutting tool of the present invention, the cutting method by splitting and scraping reduces a cutting resistance and the intermittent cutting method prevents a cutting edge from being burned. As a result of this, a cutting process with a high rotational speed and a high feed speed can be obtained.

DETAILED DESCRIPTION OF THE PREFERRED EMBODIMENTS

Figure 1:
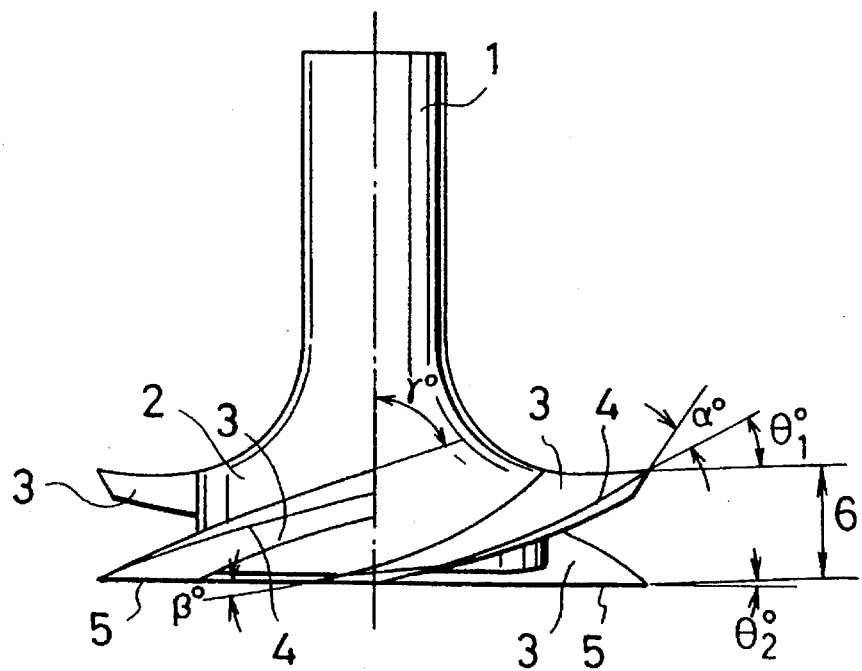
FIG. 1 is an elevation for showing the components constituting the cutting edge of the cutting tool for honeycomb core according to an embodiment of the present invention.
Figure 4:
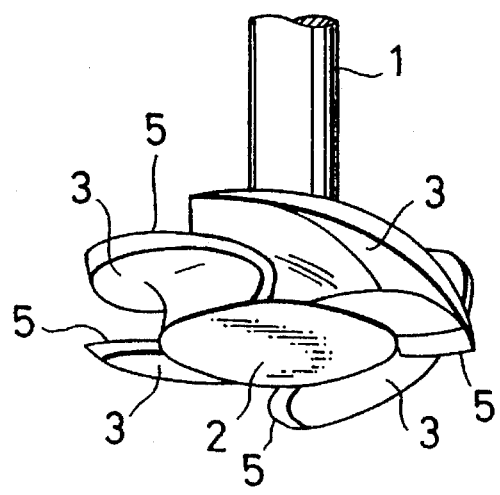
FIG. 4 is a perspective view of the bottom edge of the cutting tool according to an embodiment of the present invention.

Referring to FIGS. 1 and 4, a numeral denotes a shank of the cutting tool according to the present invention. The shank 1 is connected to a cylinder 2 with a large diameter around which a plurality of spiral blades 3 are formed integratedly together with the cylinder 2. According to an embodiment of the present invention, the cutting tool comprises four blades.

A ridgeline of the blade 3 is slanted with a lead angle $\gamma$ of at least 60 degrees with respect to an axis of the shank. It is desirable that the lead angle $\gamma$ ranges from 60 degrees to 85 degrees because the cutting effect by splitting and scraping can not be obtained below 60 degrees of the lead angle $\gamma$.

Figure 3:
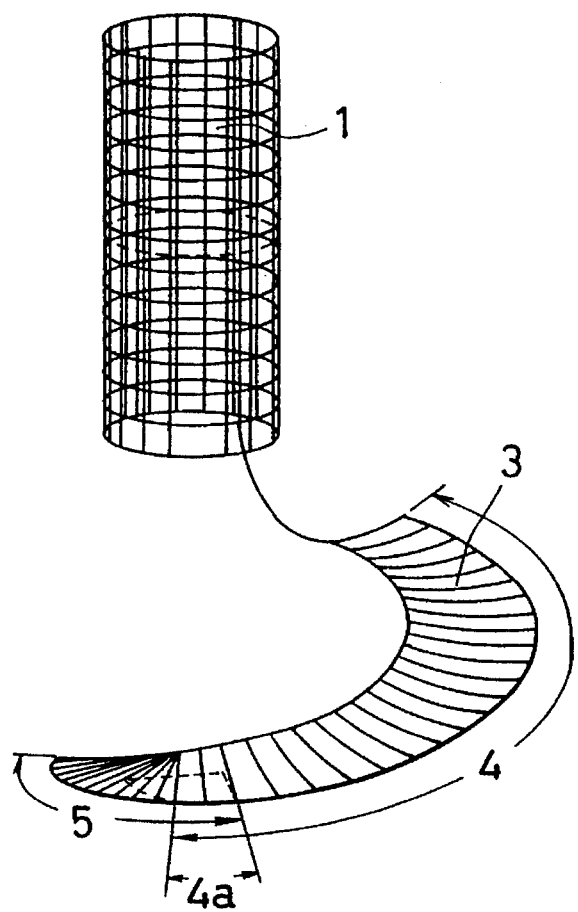
FIG. 3 is a schematic view of the cutting edge portion according to an embodiment of the present invention.

Referring now to FIG. 3, a cutting edge forming the ridgeline of the blade 3 comprises a radial edge 4 which surrounds the cylinder 2 peripherally and a bottom edge 5 which is shaped at the bottom of the cylinder 2. The radial edge 4 is smoothly connected to the bottom edge 5 through a boundary portion 4a.

The radial edge 4 is composed of as follows. Referring to FIG. 1, a numeral $\alpha$ denotes a lip angle and a numeral $\theta_1$ represents a rake angle. In this preferred embodiment, it is desirable that the lip angle $\alpha$ should be an extremely acute angle, specifically 1 to 20 degrees. The lip angle less than 1 degree should be avoided from the view point of rigidity of the cutting edge. The rake angle $\theta_1$ is determined within a range of 20 degrees to −20 degrees according to the material of a honeycomb core to be processed and cutting conditions.

Figure 2:
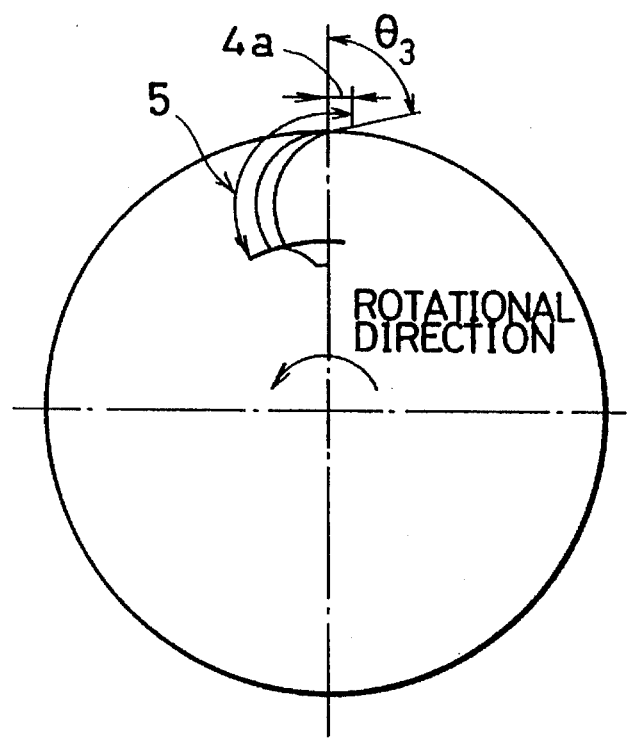
FIG. 2 is a view for explaining a figure of the bottom edge of the cutting tool for honeycomb core according to an embodiment of the present invention.

On the other hand, referring to FIG. 2, an edge portion of the bottom edge 5 has a shape of sector or involute curved toward the rotational direction of the cutting tool. With respect to the bottom edge 5, a lip angle is represented by β and a relief angle by $\theta_2$. In this preferred embodiment, the lip angle β should be within a range of 1 to 20 degrees, similarly to the lip angle of the radial edge 4. The relief angle $\theta_2$ is 2 degrees at the maximum.

A radial rake angle $\theta_3$ of the bottom edge 5 is determined at a negative degree, aiming at a smooth cutting-in. To make the radial rake angle $\theta_3$ of the bottom edge 5 negative, the rake angle $\theta_1$ of the radial edge 4 near the bottom edge 5 is rendered negative. Thus, the radial rake angle $\theta_3$ can be made negative without any special processing applied.

Figure 5:
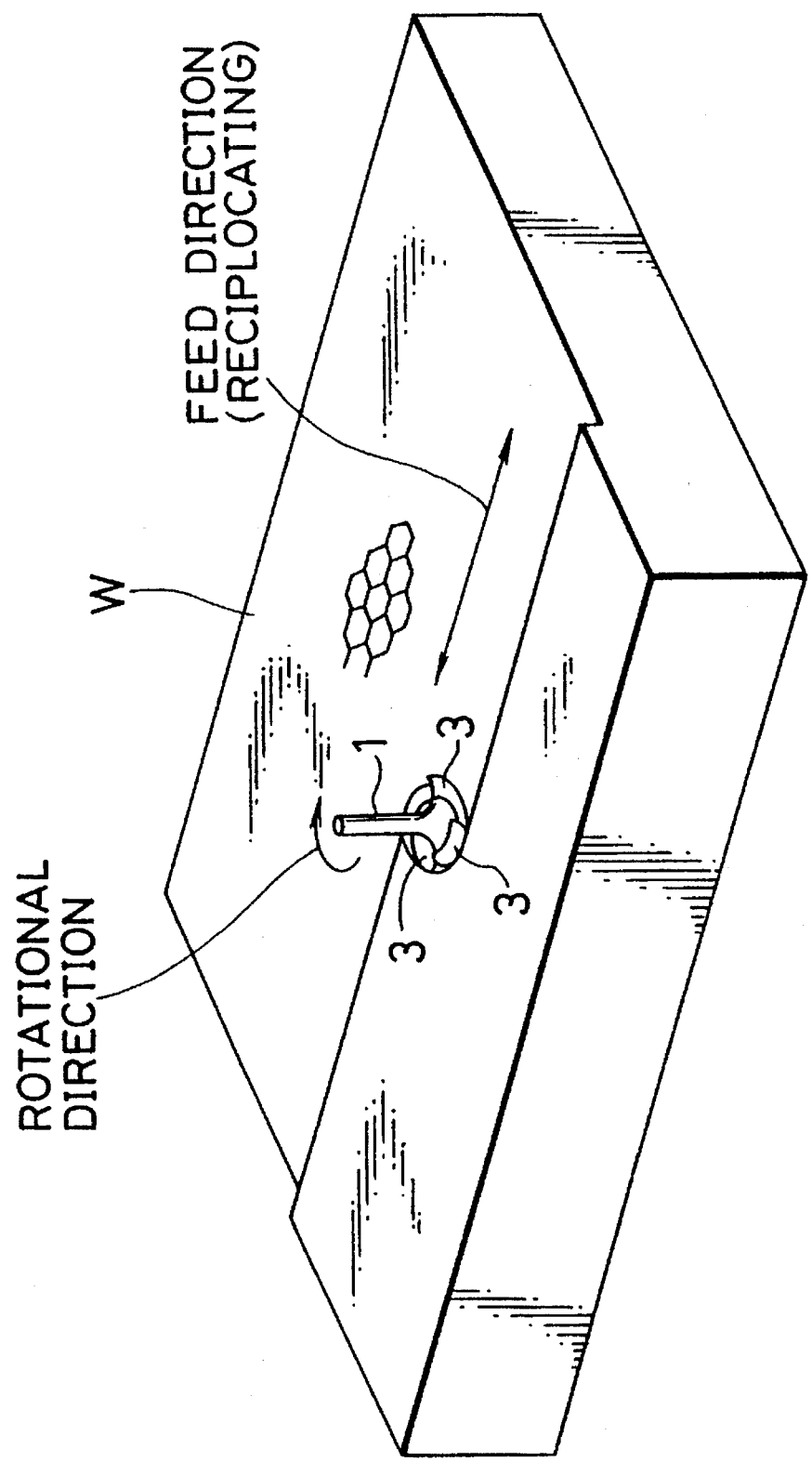
FIG. 5 is a perspective view of the cutting process using the cutting tool according to an embodiment of the present invention.

FIG. 5 is a view for showing the cutting work on a workpiece of the honeycomb core. The cutting tool is connected to the spindle of the machine (not shown) and it cuts the honeycomb core W in the lateral direction at a high revolutional speed of the cutting tool, for example 12000 rpm and at feed speed of the machine, for example 12000 mm/min.

Since the spiral blade 3 of the cutting tool has a sharp cutting edge with an extremely acute lip angle at the radial edge 4 and the bottom edge 5, the radial edge 4 cuts the honeycomb core by a splitting-scraping effect up to a depth corresponding to a vertical length of the radial edge 4 and on the other hand the bottom edge 5 cuts the honeycomb core with a width of cut approximately corresponding to a diameter of the cutting tool. Therefore, it is understood that each of the blades cuts the workpiece by the splitting-scraping effect and this occurs intermittently. That is to say, the cutting method using splitting-scraping effect together with an intermittent cutting enables the cutting tool to achieve a high rotation and high feed cutting.

Further, since the blade 3 slants with a high lead angle γ more than 60 degrees and has a sharp cutting edge with an extremely acute lip angle both at the radial edge 4 and the bottom edge 5, the cutting resistance in the radial direction and the one in the feed direction can be reduced when the honeycomb core is cut at high speeds. This reduced cutting resistance and the above intermittent cutting effect prevent the cutting tool from being burned and consequently provides it with a long life of the cutting tool. Also, with regard to the surface finish, the same finish as in the case of a prior valve stem cutter can be obtained.

Further, according to the cutting tool of the present invention, chips come off from the cutting tool easily because chips are produced in the shape of small chips or flakes by the effect of splitting and scraping of the radial edge 4 and the bite-in effect of the bottom edge 5.

Further, according to an embodiment of the present invention, since the radial rake angle $\theta_3$ of the bottom edge 5 is designed to be negative, the cutting tool can bite the workpiece smoothly.

In summary, the present invention provides a cutting tool capable of cutting with a high speed (high efficiency) by employing a splitting-scraping effect together with an intermittent cutting method and capable of elongating a tool life by reducing the cutting resistance. Further, since the shape and size of chips are like small chips or small flakes, it becomes more easy to remove chips.

Thus, the cutting tool according to the present invention will contribute a high efficiency to the cutting process of the honeycomb core.

While the presently preferred embodiment of the present invention has been shown and described, it is to be understood that this disclosure is for the purpose of illustration and that various changes and modifications may be made without departing from the scope of the invention as set forth in the appended claims.

I claim:

1. A cutting tool for cutting a honeycomb core comprising:
    a shank for being cramped on a machine tool;
    a cylinder coaxially connected to said shank;
    a plurality of blades spirally and integrally formed on said cylinder;
    a radial edge provided on an outer ridge of said blades for continuously cutting said honeycomb core;
    a bottom edge formed at a lower end of said radial edge for initially biting said honeycomb core;
    a boundary edge smoothly and continuously connected between said radial edge and said bottom edge for cutting a boundary region of said honeycomb core, wherein:
    said blades have a lead angle which is 60 degrees or greater; and
    lip angles of said radial edge and said bottom edge are between 1 and 20 degrees so as to speedily and accurately cut said honeycomb core and to improve durability of said cutting tool.

2. The cutting tool according to claim 1, wherein one end of said bottom edge is connected to said cylinder on a bottom face of said cylinder.

3. The cutting tool according to claim 1, wherein one end of said bottom edge is connected to said cylinder on a circumferential surface of said cylinder.

4. The cutting tool according to claim 1, wherein said radial edge, said bottom edge and said boundary edge are formed integratedly and continuously on said blade so as to reduce a cutting resistance.

5. The cutting tool according to claim 1, wherein an edge line of said bottom edge is curved outward in a revolutional direction of said cutting tool.

6. The cutting tool according to claim 1, wherein said second edge has a lip angle determined between 1 degree and 20 degrees.

7. The cutting tool according to claim 1, wherein said boundary edge has a lip angle determined between 1 degree and 20 degrees.

8. The cutting tool according to claim 1, further comprising:
    a radial rake angle of said bottom edge designed to be negative so as to reduce a cutting resistance.

9. A cutting tool for cutting a honeycomb core comprising:
    a shank having an end for engaging a machine;
    a cylinder coaxially connected to said shank;
    a plurality of blades spirally and integrally formed on the periphery of said cylinder, each of said blades having a first, second, and third portion and a lead angle of 60 degrees or greater; and
    a curved radial cutting edge formed continuously and smoothly along a continuous outer ridge of said first, second and third portions; wherein:

said first portion is formed at an end of and below said cylinder for initial biting of said honeycomb core;

said second portion is formed substantially along the periphery of said cylinder for continuously cutting said honeycomb core;

said third portion smoothly and continuously connects said first portion to said second portion and continuously cuts an intermediary portion of said honeycomb core; and said spiralling blades are oriented in a cutting twist, such that when said shaft is rotated in a cutting direction, said first portion initially bites and cuts said honeycomb core and material cut by said first portion is propelled away from said honeycomb core, by said orientation of said spiralling blades, toward said end of said shank for engaging a machine.

* * * * *